United States Patent
Seichter et al.

(10) Patent No.: US 9,911,235 B2
(45) Date of Patent: Mar. 6, 2018

(54) SPATIAL INTERACTION IN AUGMENTED REALITY

(71) Applicant: QUALCOMM Incorporated, San Diego, CA (US)

(72) Inventors: Hartmut Seichter, Bad Liebenstein (DE); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 14/858,777

(22) Filed: Sep. 18, 2015

(65) Prior Publication Data
US 2016/0140763 A1    May 19, 2016

Related U.S. Application Data

(60) Provisional application No. 62/080,050, filed on Nov. 14, 2014.

(51) Int. Cl.
*G06T 19/00* (2011.01)
*G06F 1/16* (2006.01)
(Continued)

(52) U.S. Cl.
CPC .......... *G06T 19/006* (2013.01); *G06F 1/1686* (2013.01); *G06F 3/011* (2013.01);
(Continued)

(58) Field of Classification Search
None
See application file for complete search history.

(56) References Cited

U.S. PATENT DOCUMENTS 8,514,295 B2    8/2013  Lee
2008/0044062 A1  2/2008  Stam et al.
(Continued)

FOREIGN PATENT DOCUMENTS

| EP | 2458880 A2 | 5/2012 | |
| WO | 2014111947 A1 | 7/2014 | |
| WO | WO2014111947 A1 * | 7/2014 | ............. G06F 3/017 |

OTHER PUBLICATIONS

Poupyrev, Ivan, et al. "The go-go interaction technique: non-linear mapping for direct manipulation in VR." Proceedings of the 9th annual ACM symposium on User interface software and technology. ACM, 1996.*

(Continued)

*Primary Examiner* — Vu Nguyen
(74) *Attorney, Agent, or Firm* — Muncy, Geissler, Olds & Lowe, P.C.

(57) ABSTRACT

A method for spatial interaction in Augmented Reality (AR) includes displaying an AR scene that includes an image of a real-world scene, a virtual target object, and a virtual cursor. A position of the virtual cursor is provided according to a first coordinate system within the AR scene. A user device tracks a pose of the user device relative to a user hand according to a second coordinate system. The second coordinate system is mapped to the first coordinate system to control movements of the virtual cursor. In a first mapping mode, virtual cursor movement is controlled to change a distance between the virtual cursor and the virtual target object. In a second mapping mode, virtual cursor movement is controlled to manipulate the virtual target object. User input is detected to control which of the first mapping mode or the second mapping mode is used.

16 Claims, 10 Drawing Sheets

(51) Int. Cl.
G06F 3/01 (2006.01)
G06F 3/03 (2006.01)
G06F 3/038 (2013.01)
H04N 5/225 (2006.01)

(52) U.S. Cl.
CPC .............. *G06F 3/012* (2013.01); *G06F 3/013* (2013.01); *G06F 3/017* (2013.01); *G06F 3/0304* (2013.01); *G06F 3/038* (2013.01); *H04N 5/225* (2013.01)

(56) References Cited

U.S. PATENT DOCUMENTS

| 2010/0322478 | A1 | 12/2010 | Nitanda | |
|---|---|---|---|---|
| 2012/0092300 | A1 | 4/2012 | Wang et al. | |
| 2012/0113223 | A1* | 5/2012 | Hilliges | G06F 3/00 348/46 |
| 2012/0163723 | A1* | 6/2012 | Balan | G06F 3/011 382/224 |
| 2013/0038729 | A1 | 2/2013 | Chang | |
| 2013/0057687 | A1 | 3/2013 | Ehlgen et al. | |
| 2014/0233795 | A1 | 8/2014 | Omino | |

OTHER PUBLICATIONS

Fritz D: "Diplomarbeitsdemo—DreiD Interaktion", Oct. 5, 2014 (Oct. 5, 2014), pp. 1-2, XP054976218, Retrieved from the Internet: URL: https://www.youtube.com/watch?v=-07bTAILEno&feature=youtu.be [retrieved on Nov. 23, 2015] abstract 1:27-2:00; figures 1-7.

Fritz D., et al., "Evaluating RGB+D Hand Posture Detection Methods for Mobile 3D Interaction", Proceedings of the 2014 Virtual Reality International Conference (VRIC '14), 27, Apr. 9, 2014 (Apr. 9, 2014), pp. 1-4, XP058058353, New York, NY, USA DOI: 10.1145/2617841.2620715 ISBN: 978-1-4503-2626-1 figures 1,2 Sections 1, 3, and 4.

International Search Report and Written Opinion—PCT/US2015/051237—ISA/EPO—dated Dec. 7, 2015

Marzo A., et al., "Interacting with Multi-touch Handheld Devices in Augmented Reality Spaces; Effects of Marker and Screen Size", Proceedings of the 13th International Conference on Interaccion Persona-Ordenador, Interaccion '12, 8, Oct. 3, 2012 (Oct. 3, 2012), pp. 1-2, XP055229471, New York, New York, USA DOI: 10.1145/2379636.2379644 ISBN: 978-1-4503-1314-8 figure 2.

Dong N., et al., "Adaptive Object Detection and Visibility Improvement in Foggy Image," Journal of Multimedia, Feb. 2011, vol. 6 (1), pp. 14-21.

Poupyrev I., et al., "The Go-Go Interaction Technique: Non-linear Mapping for Direct Manipulation in VR," Proceedings of the 9th annual ACM symposium on User interface software and technology, 1996, pp. 79-80.

Walairacht S., et al., "4+4 Fingers Manipulating Virtual Objects in Mixed-Reality Environment," Presence, Apr. 2002, vol. 11 (2), pp. 134-143.

Wang R.Y., et al., "Real-Time Hand-Tracking with a Color Glove," ACM Transactions on Graphics, vol. 28 (3), Article 63, Aug. 2009, 8 pages.

Bowman D.A., et al., "An Evaluation of Techniques for Grabbing and Manipulating Remote Objects in Immersive Virtual Environments", Proceedings of 1997 Symposium on Interactive 3D Graphics, Apr. 27, 1997, Providence, RI, USA, New York, NY, USA, Apr. 27, 1997 (Apr. 27, 1997), pp. 35-38, XP000725357, DOI: 10.1145/253284.253301,ISBN: 978-0-89791-884-8.

Vogel D., et al., "Distant Freehand Pointing and Clicking on Very Large, High Resolution Displays", Proceedings of the 18th Annual ACM Symposium on User Interface Software and Technology, UIST '05, Oct. 27, 2005 (Oct. 27, 2005), pp. 33-42, XP055038902, DOI: 10.1145/1095034.1095041, ISBN: 978-1-59-593271-6.

* cited by examiner

SPATIAL INTERACTION IN AUGMENTED REALITY

CROSS-REFERENCE TO RELATED APPLICATION

The present application for patent claims the benefit of U.S. Provisional Application No. 62/080,050, entitled "SPATIAL INTERACTION IN AUGMENTED REALITY," filed Nov. 14, 2014, assigned to the assignee hereof, and expressly incorporated herein by reference in its entirety.

FIELD OF DISCLOSURE

Aspects of the present disclosure relate generally to augmented reality and in particular to spatial interaction in an augmented reality environment.

BACKGROUND

Augmented reality is a burgeoning technology that combines real-world imagery with computer-generated data, such as graphics or textual information. Augmented reality technology superimposes graphics, audio, and other sensory enhancements onto the real world, thus enhancing reality, using advanced user devices such as tablets, smart phones, and the like. Augmented reality allows the user to interact with real objects in real time, registering the virtual imagery with the real world.

Some of today's augmented reality applications still have challenges, however.

SUMMARY

In one aspect a method for spatial interaction in Augmented Reality (AR) includes displaying an AR scene that includes an image of a real-world scene, a virtual target object, and a virtual cursor. A position of the virtual cursor is provided according to a first coordinate system within the AR scene. A user device tracks a pose of the user device relative to a user hand according to a second coordinate system. The second coordinate system is mapped to the first coordinate system to control movements of the virtual cursor. In a first mapping mode, virtual cursor movement is controlled to change a distance between the virtual cursor and the virtual target object. In a second mapping mode, virtual cursor movement is controlled to manipulate the virtual target object. User input is detected to control which of the first mapping mode or the second mapping mode is used.

In another aspect, an apparatus includes means for acquiring, by a user device, an image of a real-world scene and means for displaying, on the user device, an augmented reality (AR) scene that includes the image of the real-world scene, a virtual target object, and a virtual cursor. A position of the virtual cursor is provided according to a first coordinate system within the AR scene. The apparatus further includes means for tracking a pose of the user device relative to a user hand according to a second coordinate system that defines a relationship between the user device and the user hand. A means for mapping the second coordinate system to the first coordinate system is also included in the apparatus to control movement of the virtual cursor in the AR scene in response to movements of the user hand. The means for mapping the second coordinate system to the first coordinate system includes a first mapping mode and a second mapping mode, where the first mapping mode is configured to control movement of the virtual cursor to change a distance between the virtual cursor and the virtual target object in the AR scene, and where the second mapping mode is configured to control movement of virtual hand to manipulate the virtual target object within the AR scene. The apparatus also includes means for detecting, at the user device, a user input to control which of the first mapping mode and the second mapping mode is used to control movement of the virtual cursor in the AR scene.

Another aspect is directed to a user device that includes a camera, a display, memory, and a processing unit. The camera is configured to capture an image of a real-world scene and the display is configured to display an augmented reality (AR) scene that includes the image of the real-world scene, a virtual target object, and a virtual cursor. A position of the virtual cursor is provided according to a first coordinate system within the AR scene. The memory is adapted to store program code and the processing unit is coupled to the memory to access and execute instructions included in the program code to direct the user device to: (i) track a pose of the user device relative to a user hand according to a second coordinate system that defines a relationship between the user device and the user hand; (ii) map the second coordinate system to the first coordinate system to control movement of the virtual cursor in the AR scene in response to movements of the user hand, wherein mapping the second coordinate system to the first coordinate system includes a first mapping mode and a second mapping mode, wherein the first mapping mode is configured to control movement of the virtual cursor to change a distance between the virtual cursor and the virtual target object in the AR scene, and wherein the second mapping mode is configured to control movement of virtual cursor to manipulate the virtual target object within the AR scene; and (iii) detect a user input to control which of the first mapping mode and the second mapping mode is used to control movement of the virtual cursor in the AR scene.

In yet another aspect, a non-transitory computer-readable medium includes program code stored thereon. The program code includes instructions which when executed cause a user device to: (i) acquire an image of a real-world scene; (ii) display an augmented reality (AR) scene that includes the image of the real-world scene, a virtual target object, and a virtual cursor, where a position of the virtual cursor is provided according to a first coordinate system within the AR scene; (iii) track a pose of the user device relative to a user hand according to a second coordinate system that defines a relationship between the user device and the user hand; (iv) map the second coordinate system to the first coordinate system to control movement of the virtual cursor in the AR scene in response to movements of the user hand, where the mapping of the second coordinate system to the first coordinate system includes a first mapping mode and a second mapping mode, where the first mapping mode is configured to control movement of the virtual cursor to change a distance between the virtual cursor and the virtual target object in the AR scene, and where the second mapping mode is configured to control movement of virtual cursor to manipulate the virtual target object within the AR scene; and (v) detect a user input to control which of the first mapping mode and the second mapping mode is used to control movement of the virtual cursor in the AR scene.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
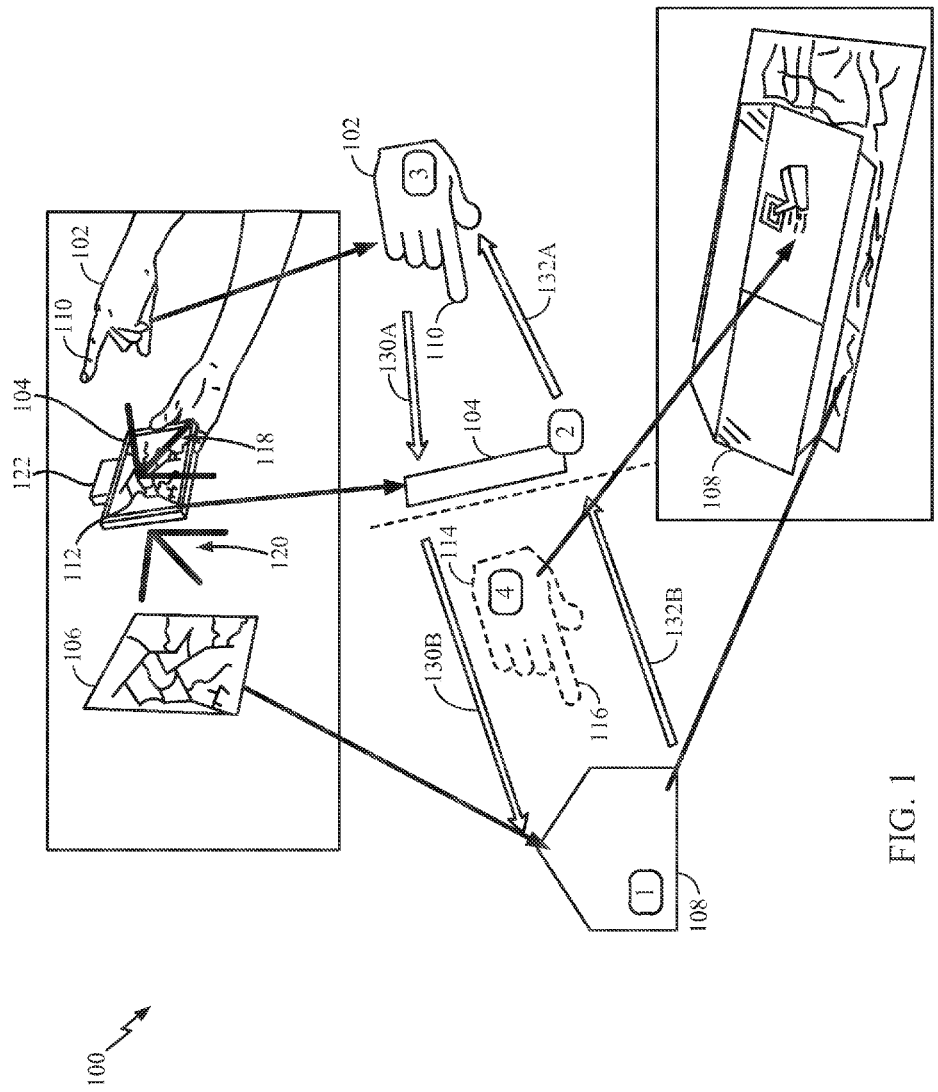
FIG. 1 illustrates an augmented reality environment according to one or more implementations of the technology described herein.

The technology described herein is directed to using a three-dimensional (3D) sensing device to track a user hand on the screen side of a handheld device to create a more natural connection for the user between the locomotion of the hand and what occurs in an augmented reality scene. In one or more implementations, a user device has multiple coordinate systems: an object-to-device coordinate system (for an object space), a hand-to-device coordinate system (for a control space), and a virtual cursor coordinate system (for cursor space). The user device acquires translational and rotational movements of a user hand and/or translational and rotational movements of the user device itself to control movement of a "virtual hand" or a "virtual cursor" in three dimensions (3D). The virtual cursor may then interact with the augmented reality (AR) scene. Because a user hand may have twenty-seven degrees of freedom, more options for mapping coordinates between coordinate system may be provided to control movement of the virtual cursor.

The examples described herein may implement two different mapping modes for mapping the hand-to-device coordinate system to the virtual cursor coordinate system to control movements of the virtual hand in the AR scene in response to movements of the user hand. The first mapping mode (also referred to herein as a GoGo mechanism) uses the metaphor of interactively growing the user's arm and non-linear mapping for reaching and manipulating distant objects in the AR scene to enable seamless direct manipulation of both nearby objects and those at a distance. The first mapping mode allows a user to change his or her arm length at will to grasp and manipulate objects in the AR scene that are located far away from as well as close to the user. In one aspect, mapping the hand-to-device coordinate system to the virtual cursor coordinate system according to the first mapping mode takes into account translational and rotational movement of the user hand relative to the user device as well as translational and rotational movement of the user device relative to the virtual target object when controlling movement of the virtual cursor.

The second mapping mode (also referred to herein as a Magic Hand mechanism) enables precise manipulation of virtual target objects included in the AR scene. In the second mapping mode, the user device-to-hand coordinate system may be mapped directly to the virtual cursor coordinate system, such that the control space is put directly into the object space. This allows for very precise direct manipulation of objects. In one aspect, mapping the hand-to-device coordinate system to the virtual cursor coordinate system according to the second mapping mode takes into account translational and rotational movement of the user hand relative to the user device independent of any translational and rotational movement of the user device relative to the virtual target object when controlling movement of the virtual cursor.

One difference between the GoGo mechanism and the Magic Hand mechanism is how the user device's two coordinate systems are interpreted and/or combined together to produce the virtual cursor. In the GoGo mechanism, translation in the coordinate systems is normalized but the rotation is not. The size of the hand detection system's range in the user device is used to normalize translation data. The rotation is rotated towards the user device. Then, a linear interpolation is performed to translate movements of the user hand in the control space into movements of the virtual cursor in the cursor space. It is because of this that a user can reach to the end of the user device.

In one or more implementations, the GoGo Magic mechanism also includes gesture and/or posture detections for fingers. Interpretation of the finger posture allows for switching between the GoGo mechanism (open Hand) and the Magic Hand mechanism (index finger pointing). Interpretation of the gesture and/or posture detections for fingers also allows for distinguishing between selection and manipulation. For example, the GoGo Magic mechanism may interpret a first as a request to switch between selection provided by the GoGo mechanism and manipulation provided by the Magic Hand mechanism.

In one or more implementations, a Chopsticks mechanism uses the tips of chopsticks to create points that are on one side of the user device. The Chopsticks mechanism also uses the center point of the user device as a cube. The user can then use the Chopsticks to select objects in the augmented reality scene with the tips of the Chopsticks. Alternatively, instead of using physical chopsticks a user could use virtual chopsticks.

Alternatively still, a user may simulate chopstick motion using a thumb and index finger, or any two fingers, to accomplish a pinching gesture to zoom virtual or actual tips of the chopsticks in and out. Other suitable finger poses and/or gestures include varying the pressure on a button in the hand, etc. Other user inputs are possible as well, including, but not limited to voice, touch, and the like.

FIG. 1 illustrates an augmented reality environment 100 according to one or more implementations of the technology described herein. The illustrated augmented reality environment 100 includes a user hand 102, a user device 104, and a target 106. A camera included in the user device 104 captures, or otherwise acquires an image of a real-world scene that includes the target 106. The user device 104 may then render an AR scene on the display 112 that includes the image of the scene, a virtual target object 108 (e.g., a virtual house), and a virtual hand 114 (i.e., a virtual cursor). The illustrated user hand 102 includes an index finger 110. Also in the illustrated environment 100, the virtual hand 114 includes a virtual index finger 116. The augmented reality environment 100 also includes a first coordinate system 120 and a second coordinate system 118. In one aspect, a position of the virtual hand 114 is provided within the AR scene according to a first coordinate system 120. Similarly, a second coordinate system 118 defines a relationship between the user device 104 and the user hand 102. In one example, a pose of the user device 104 relative to user hand 102 may be expressed using coordinates from the second coordinate system 118. The augmented reality environment 100 also includes a sensor 122 coupled to the user device 104. The augmented reality environment 100 includes a virtual space 124.

In one or more implementations, the augmented reality environment 100 uses a vision-based tracking system by way of a camera coupled to or embedded within user device 104 to track the pose of user device 104 relative to the virtual target object 108. The augmented reality environment 100 then may determine the three-dimensional (3D) relationship between the virtual target object 108 and the user device 104. The augmented reality environment 100 also tracks a pose of the user device 104 relative to the user hand 102 using sensor 122 with reference to coordinate system 118. The coordinate system 118 is then mapped to the coordinate system 120 to control movements of virtual hand 114 in the AR scene in response to movements of user hand 102.

In operation, the augmented reality environment 100 may capture an image of a real-world scene, identify objects in the scene using a scene recognition algorithm, retrieve information based on the identified objects, and create a combined display of an image of the physical scene and information related to the identified objects, and thereby augment the physical scene. In an augmented reality system, a user's view of the real world is enhanced with virtual computer-generated graphics (e.g., virtual target object 108). These graphics are spatially registered so that they appear aligned with the real world from the perspective of the viewing user. For example, the spatial registration can make a virtual character appear to be standing on a real table.

In one or more implementations, the augmented reality environment 100 may be used in a gaming setting, an instructional setting, industrial design, sports and entertainment, a medical environment, or other suitable environment that can benefit from the use of augmented reality technology.

In one or more implementations, the user hand 102 may be part of any human viewer of the user device 104. As such, the user hand 102 can interact with the user device 104 using a variety of modalities. Of course, the user hand 102 can be part of any mechanical device such as a robot capable of interacting with the user device 104, under the control of a human, for example.

In one or more implementations, the user device 104 may be any user equipment such as telephones, tablet computers, "phablet (phone+tablet)" computers, smart phones, laptop and desktop computers, and the like. In one or more implementations, the user device 104 may include one or more orientation sensing modules, cameras, wireless transceivers, graphics engines, processors, user interfaces (e.g. display 112, keypad), eye movement detection modules, hand movement detection modules, voice detection module, speech recognition module, facial expression recognition module, head tracking module, and the like. The user device 104 may have six degrees of freedom.

In one or more implementations, the target 106 may be a place, object, general direction, person, or other similar item. The target 106 may be stationary or moving. In one example, target 106 is an object that includes distinguishing observable features, such as texture, shape, pattern, or size that are recognized by the user device 104 for tracking and aiding in pose estimates by the user device 104 for the generation of virtual target objects in the AR scene. For example, target 106 may be a printout of a previously determined pattern that is recognizable by the vision-based tracking system of the user device 104. Thus, the camera of user device 104 may capture one or more images of a real-world scene that includes target 106, perform one or more recognition algorithms on the images to detect the presence of target 106, then track target 106 in subsequent images such that the pose of user device 104 may be tracked relative to target 106 as well as relative to any virtual target objects (e.g., 108) that are generated with respect to target 106.

The illustrated display 112 may be a touch screen display, a holographic display, etc., that is capable of displaying text, images, and the like.

The illustrated coordinate system 118 is the coordinate system for the user hand 102 relative the user device 104. The coordinate system 120 is the coordinate system for providing a position of the virtual hand 114. Having the coordinate system 118 and the coordinate system 118 provides twelve degrees of freedom because the user hand 102 can move, the user hand 102 can turn, the user device 104 can move, and the user device 104 can turn.

The illustrated sensor 122 may be any suitable device that is capable of sensing an articulated hand, such as an infrared sensor. Alternatively, the sensor 122 may be a magnetic, acoustic, inertial, optical, mechanical, etc., sensor that are capable of tracking and/or detecting movement of a user hand, finger poses, fist, etc. Additionally, the sensor 122 may implement mechanisms to determine the position of the user device 104. Thus, the sensor 122 may implement mechanisms that include using data from a network, including triangulation, Wi-Fi positioning, and the like.

In one or more implementations, the sensor 122 may distinguish fingers, palm, etc., and provide the data to the user device 104. The illustrated sensor 122 may be any suitable three-dimensional (3D) sensing device.

Figure 2:
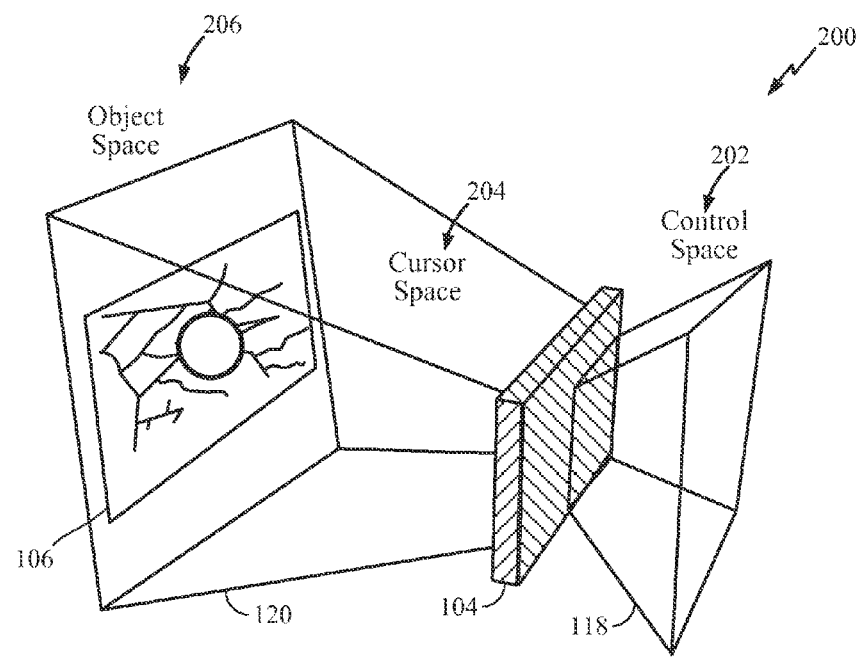
FIG. 2 illustrates a spatial interaction mechanism for use in an augmented reality environment according to implementations of the technology described herein.

FIG. 2 illustrates an implementation of a first mapping mode (e.g., a GoGo mechanism) according to implementations of the technology described herein. Using the GoGo mechanism 200 a user hand 102 can reach objects at a distance greater than the user's arm's length. The illustrated GoGo mechanism 200 may include a control space 202 (including coordinate system 118), a cursor space 204 (including coordinate system 120), and an object space 206.

The object space 206 is associated with the user device 104 and may provide for a pose of the user device 104 relative to target 106. The control space 202 spans between the user device 104 and the user hand 102 (shown in FIG. 1). The size of the control space 202 may be dynamically mapped to the object space 206 to provide the cursor space 204. The target 106 and/or virtual target object 108 are also registered in the cursor space 204. Depending on how far away the user is from the user device 104 the user hand 102 may be able to always reach into the scene on the screen on the display 112. By way of example and with reference to FIG. 1, user device 104 may track the pose of user device 104 relative to user hand 102 in order to detect a translational movement of the user hand 102 for a first distance 130A (e.g., user hand 102 moves closer/towards user device 104). In this example, the first mapping mode includes normalizing the detected translational movement of the user hand 102 to a translational movement of the virtual hand 114 a second distance 130B in the AR scene (e.g., virtual hand 102 moves closer/towards virtual target object 108). However, because of the normalizing of the translational movement into the coordinate system 120 the second distance 130B is greater than the first distance 130A. By way of another example, user device 104 may track the pose of user device 104 relative to user hand 102 in order to detect a translational movement of the user hand 102 for a first distance 132A (e.g., user hand 102 moves away from user device 104). In this example, the first mapping mode also includes normalizing the detected translational movement of the user hand 102 to a translational movement of the virtual hand 114 a second distance 132B in the AR scene (e.g., virtual hand 102 moves away from virtual target object 108). Similarly, because of the normalizing of the translational movement into the coordinate system 120, the second distance 132B is greater than the first distance 132A.

Furthermore, the user device may detect translational and/or rotational movement of user device 104, where the detected translational and rotational movement of the user device is combined with the translational and rotational movement of the user hand to provide translational and rotational movement of the virtual hand 114.

Figure 3:
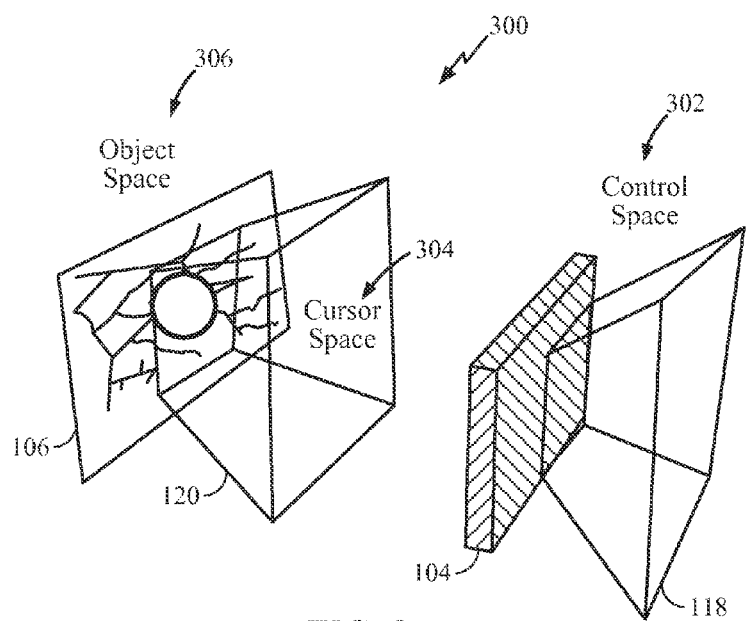
FIG. 3 illustrates a spatial interaction mechanism for use in according to alternative implementations of the technology described herein.

FIG. 3 illustrates an implementation of a second mapping mode (e.g., the Magic Hands mechanism 300) according to implementations of the technology described herein. In the illustrated implementation, a control space 302, which is generated by the sensor 122 on the user device 104, is being mapped (e.g., directly mapped) to a cursor space 304 that is associated with object space 306. As shown in FIG. 3, the cursor space 304 is detached from the user device 104. That is, the mapping may be a one-to-one mapping so that objects (e.g., virtual target object 108) in the object space 306 may be precisely manipulated. Thus, the Magic Hands mechanism may allow for precise manipulation of objects in the scene shown on the display 112 of the user device 104. Manipulation of the virtual target object 108 may include selecting, activating, touching, moving, resizing, rotating, or otherwise interacting with the virtual target object 108 through virtual hand 114. The sensor 122 may be implemented using infrared optics, cameras, depth sensors, and the like. In one or more implementations, the cursor space 304 is where objects can be manipulated and where the virtual hand 116 is moving around. The Magic Hands mechanism 300 allows for fine grained manipulations of objects. By way of example and with reference to FIG. 1, user device 104 may track the pose of user device 104 relative to user hand 102 in order to detect a translational movement of the user hand 102 for a first distance 130A (e.g., user hand 102 moves closer or towards user device 104). In this example, the second mapping mode includes directly mapping the detected translational movement of the user hand 102 to a translational movement of the virtual hand 114 a second distance 130B in the AR scene (e.g., virtual hand 102 moves closer or towards virtual target object 108). Thus, because of the direct mapping of the translational movement into the coordinate system 120 the second distance 130B is equal to the first distance 130A. Similarly, the user device may detect rotational movement of user hand 102, where the detected rotational movement is directly mapped to a rotational movement of virtual hand 114 (e.g., a 10 degree rotation of user hand 102 results in a 10 degree rotation of virtual hand 114). In one aspect, the user device may determine translational and rotational movement of the virtual hand 114 independent of any translational and rotation movement of the user device 104 relative to target 106.

Figure 4:
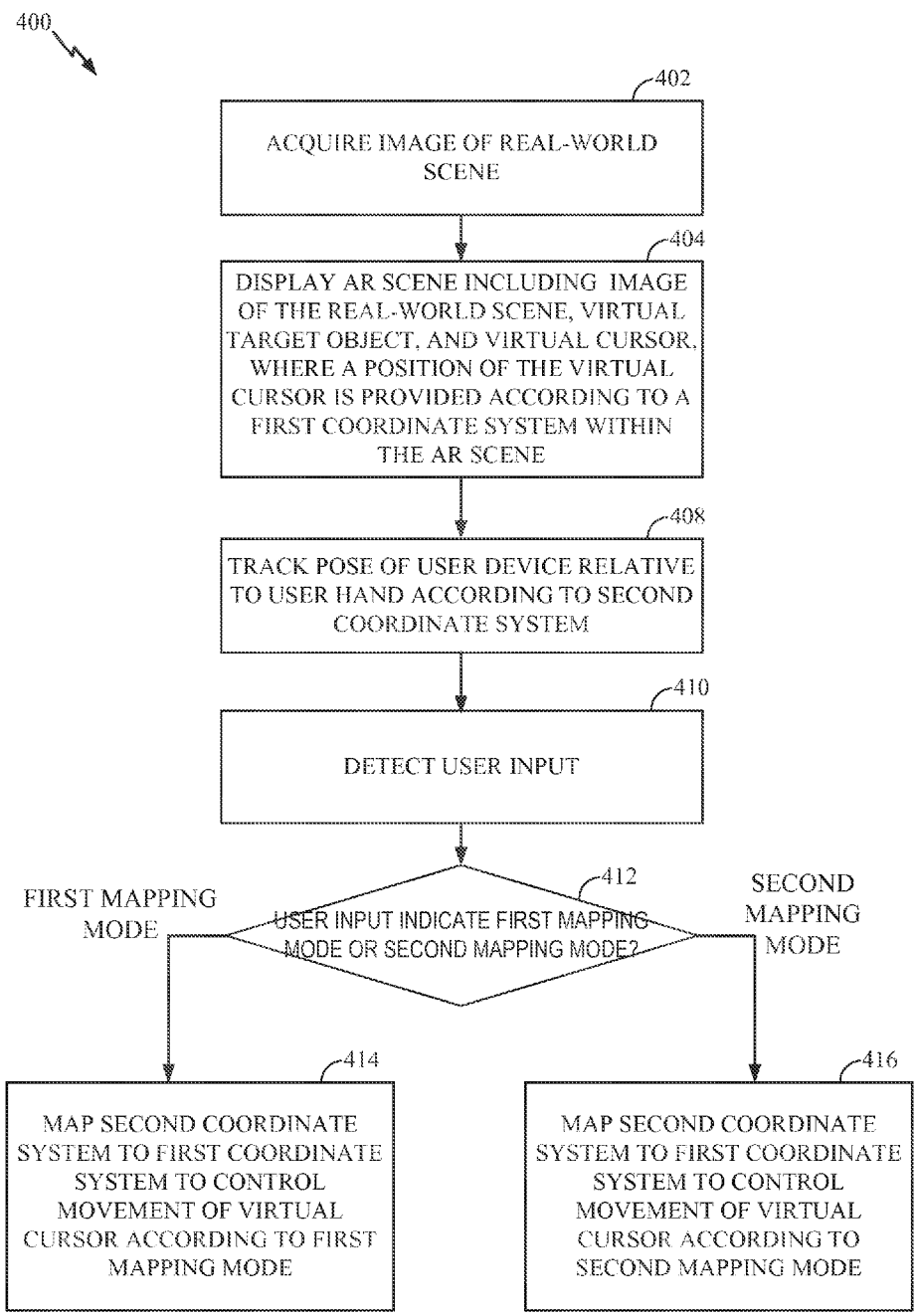
FIG. 4 is a flowchart of a method of operating a spatial interaction mechanism for use in how an augmented reality environment according to implementations of the technology described herein.

FIG. 4 is a flowchart of a process 400 illustrating operation of the augmented reality environment 100 to allow a user to select and manipulate a virtual target object in accordance with one or more implementations. Process 400 is one possible process performed by user device 104 of FIG. 1.

In a process block 402, user device 104 captures, or otherwise acquires an image of a real-world scene. In process block 404, the display 112 displays an AR scene that includes the image of the real-world scene, the virtual target object 108, and the virtual hand 114. As mentioned above, a position of the virtual hand is provided according to a first coordinate system 120 within the AR scene. In process block 408, the user device 104 tracks a pose of the user device 104 relative to the user hand 102 according to the second coordinate system 118. In process block 410, the user device 104 detects user input. As mentioned above, detecting user input may be performed by way of sensor 122 to detect at least one of a finger posture and/or a hand gesture of user hand 102. Next, in decision block 412, user device 412 determines whether the user input indicates that the user device 102 should operate in the first mapping mode or the second mapping mode to control movement of virtual hand 116 in the AR scene. In one example, a finger point (e.g., by index finger 110) is detected in order to switch to the second mapping mode (e.g., Magic hands mechanism). In another example, an open hand gesture of user hand 102 is detected in order to switch to the first mapping mode (e.g., GoGo mechanism). Furthermore, a first posture of user hand 102 may be detected to switch from the first mapping mode to the second mapping mode. Thus, user hand 102 may, in effect, reach for a virtual target object 108 in the first mapping mode by way of an open hand gesture, and then switch to control or manipulation of the virtual target object 108 in the second mapping mode by then closing the open hand to a first posture.

Accordingly, if user device 102 determines that the detected user input indicates the first mapping mode, process 400 proceeds to process block 414 where the second coordinate system 118 is mapped to the first coordinate system 120 to control movement of the virtual hand 114 according to the first mapping mode, such as described above with reference to the GoGo mechanism 200 of FIG. 2. Similarly, if user device 102 determines that the detected user input indicates the second mapping mode, process 400 proceeds to process block 416 where the second coordinate system 118 is mapped to the first coordinate system 120 to control movement of the virtual hand 114 according to the second mapping mode, such as described above with reference to the Magic Hands mechanism 300 of FIG. 3.

Figure 5A:
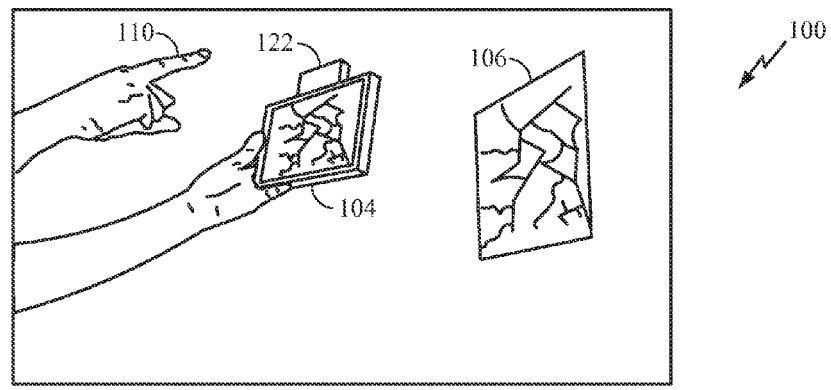
FIGS. 5A through 5C are pictorial representations illustrating a relationship between a target and a hand in various poses according to one or more implementations of the technology described herein.
Figure 5B:
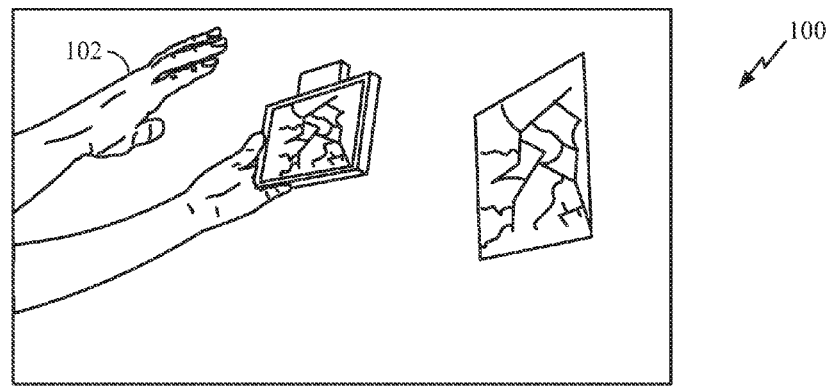
Figure 5C:
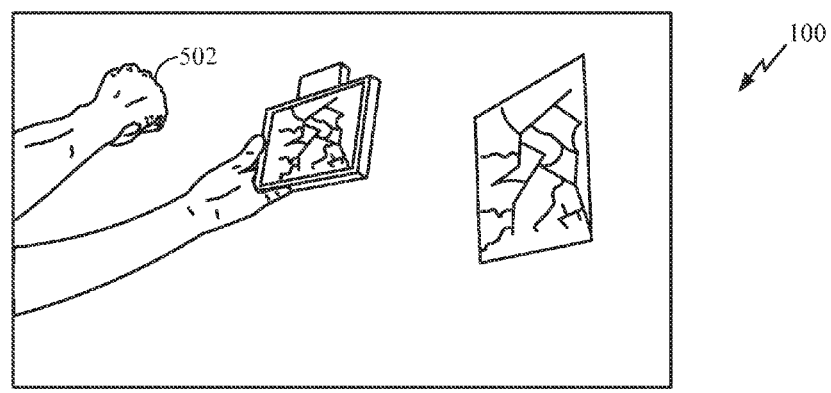

FIGS. 5A through 5C illustrate a relationship between the target 106 and the hand 102 in the augmented reality environment 100 according to one or more implementations of the technology described herein. FIG. 5A illustrates an index finger 110 pointing posture according to one or more implementations of the technology described herein. FIG. 5B illustrates an open hand gesture of user hand 102 according to one or more implementations of the technology described herein. FIG. 5C illustrates a first posture 502 according to one or more implementations of the technology described herein. As mentioned above, the user device 102 may interpret the first posture 502 as a request to switch from virtual hand 114 movement provided by the GoGo mechanism 200 and virtual target object 108 manipulation provided by the Magic Hand mechanism 300.

Figure 6:
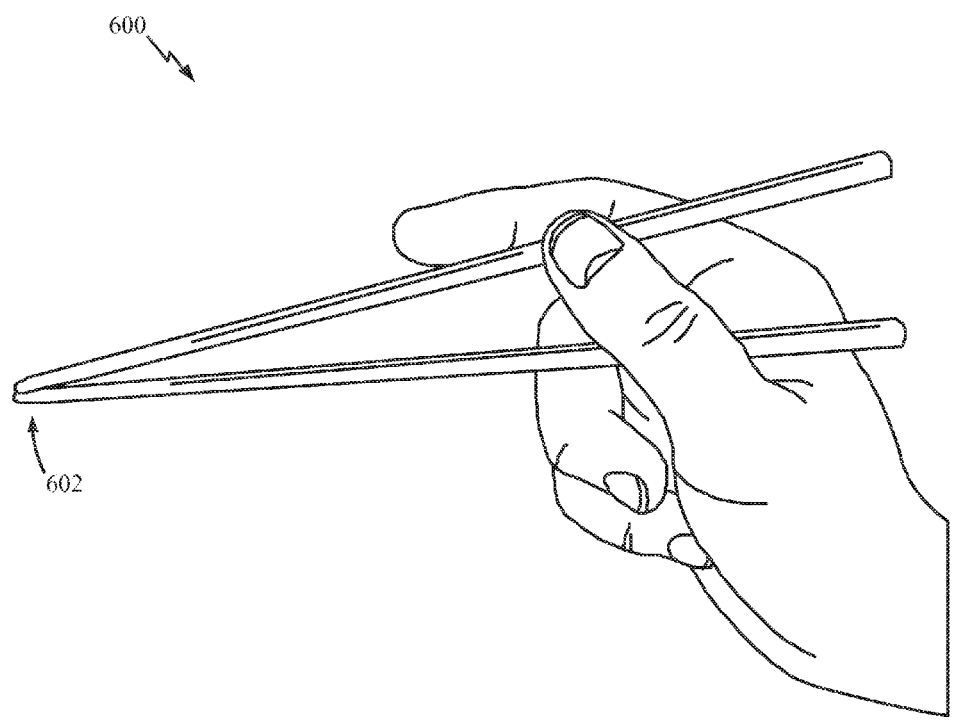
FIG. 6 is a picture illustrating a Chopsticks mechanism 600 according to one or more implementations of the technology described herein.

FIG. 6 is a picture illustrating a Chopsticks mechanism 600 according to one or more implementations of the technology described herein. The Chopsticks mechanism 600 includes tips 602 to control a target point in the augmented reality scene. In one aspect, the target point controlled by the chopsticks mechanism 600 is a virtual cursor as described above. In another aspect, the target point controlled by the chopsticks mechanism 600 is the virtual target object, as described above. The user can then use the Chopsticks mechanism 600 to select and/or manipulate objects in the augmented reality scene with the tips 602.

Figure 7:
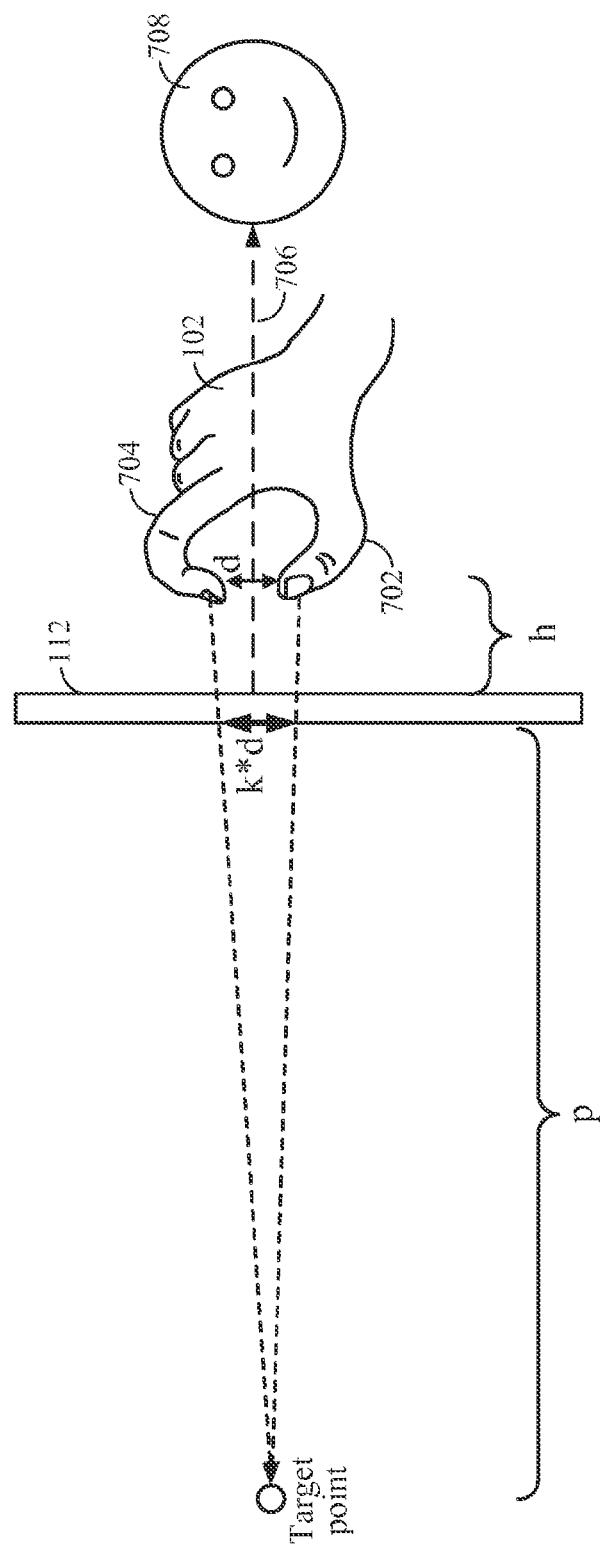
FIG. 7 is a pictorial diagram illustrating Chopsticks mechanism 600 operation according to one or more implementations of the technology described herein.

FIG. 7 is a pictorial diagram illustrating Chopsticks mechanism 600 operation according to one or more implementations of the technology described herein. In one or more implementations, the Chopstick 600 mechanism measures the distance h of the hand 102 from the screen and the distance d of the thumb 702 and forefinger 704 using a depth camera included in the user device 104. A target point lies on a ray 706 through the midpoint between thumb 702 and the forefinger 704. The origin of the ray 706 may be fixed relative to the screen on the display 112, or may be determined from tracking of a user 708's head with the camera in the user device 104 that faces the user. The distance p of the target point along the ray 706 is proportional to both d and h: p=k*d*h, where k is a constant. In one aspect, the constant k is chosen by the user 708. In another aspect the constant k is predetermined by the user device 104.

Figure 8:
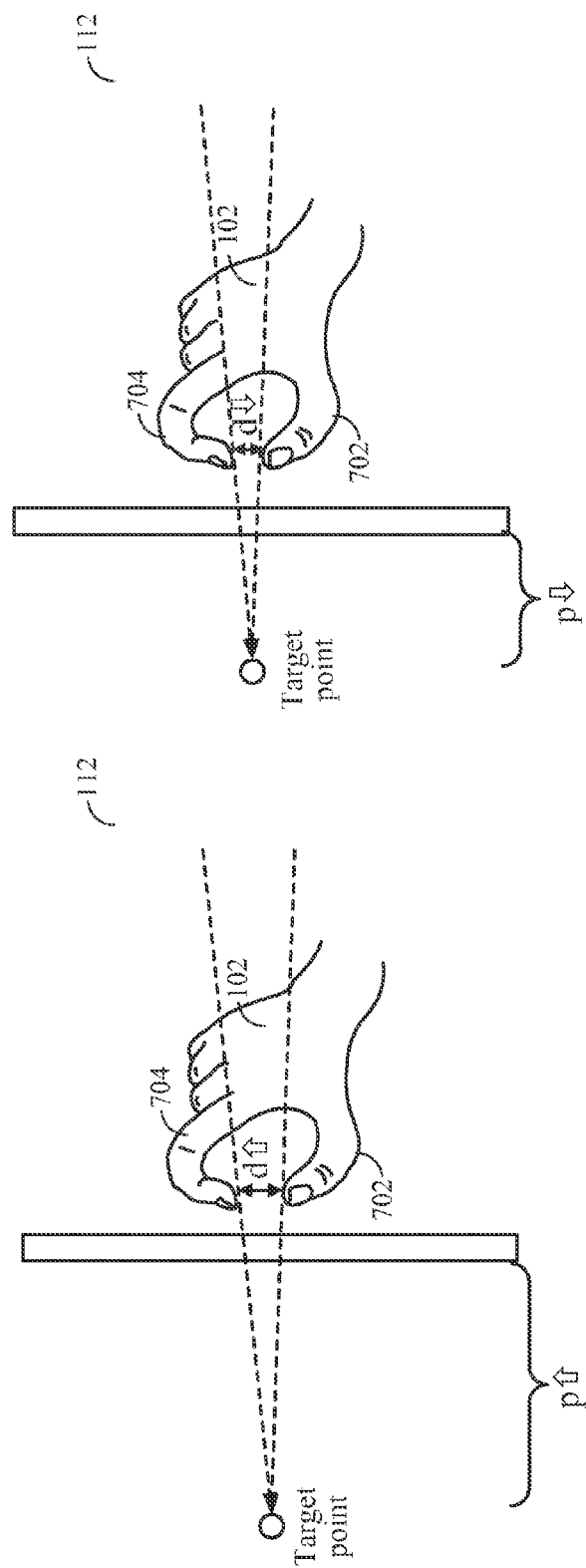
FIGS. 8A and 8B are diagrams illustrating the Chopsticks mechanism 600 operation according to one or more implementations of the technology described herein.

FIGS. 8A and 8B are diagrams illustrating the Chopsticks mechanism 600 operation according to one or more implementations of the technology described herein. Using the Chopsticks mechanism 600 illustrated in FIG. 8A, if the user 708 increases the distance d between thumb 702 and the forefinger 704, the user device 104 may control the AR scene such that the distance p to the target point becomes larger. In one aspect, the user device 104 controls the distance p my moving the target point, such as virtual hand 114 within the AR scene. As shown in FIG. 8B, if the user 708 decreases the distance d of thumb 702 and the forefinger 704, then user device 104 controls the AR scene such that the distance p to the target point becomes smaller.

Figure 9:
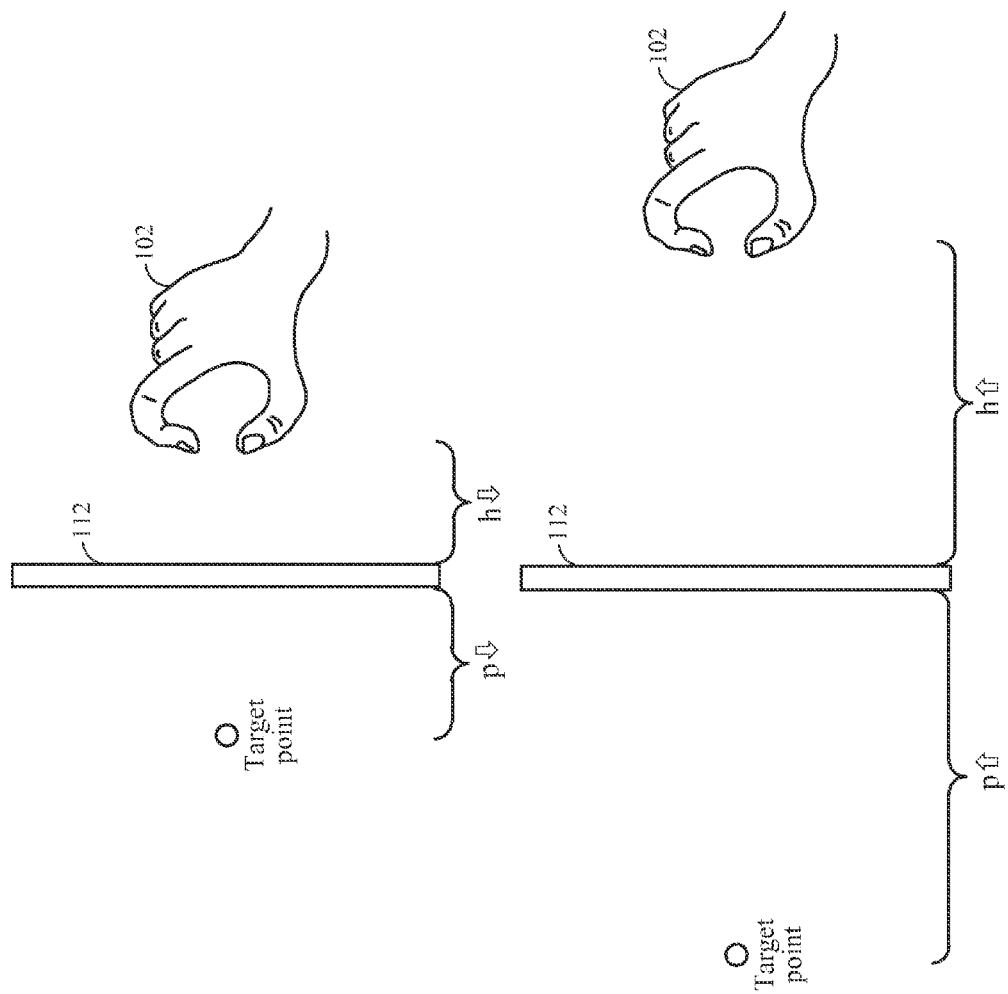
FIGS. 9A and 9B are diagrams illustrating the Chopsticks mechanism 600 operation according to one or more implementations of the technology described herein.

FIGS. 9A and 9B are diagrams illustrating the Chopsticks mechanism 600 operation according to one or more implementations of the technology described herein. Using the Chopsticks mechanism 600 illustrated in FIG. 9A, if the user 708 moves his or her hand 102 towards the screen on the display 112, decreasing the distance h, then the user device 104 controls the AR scene such that the distance p to the target point becomes smaller. Similarly, as shown in FIG. 9B, if the user moves the hand away from the screen, increasing the distance h, then the user device 104 controls the AR scene such that the distance p to the target point becomes larger.

Figure 10:
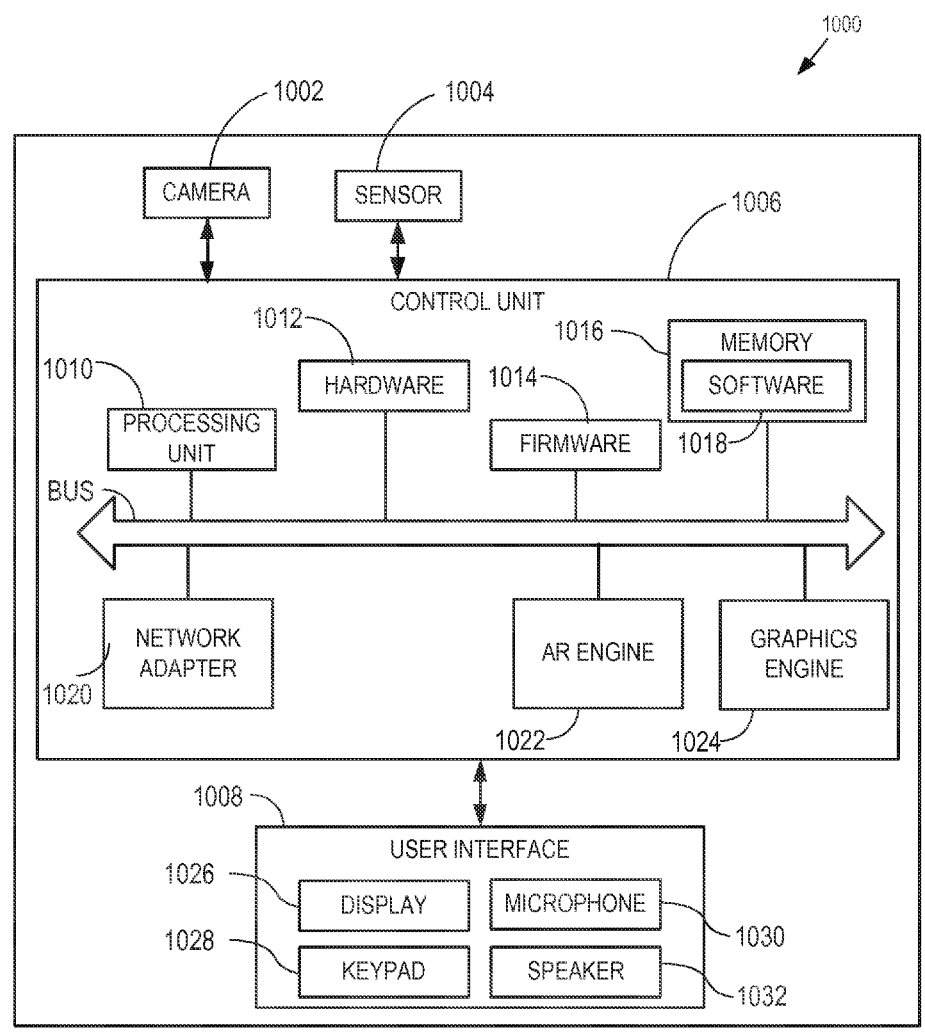
FIG. 10 is a functional block diagram illustrating an apparatus 1000 capable of performing the processes discussed herein.

FIG. 10 is a functional block diagram illustrating an apparatus 1000 capable of performing the processes discussed herein. In one example apparatus 1000 is a user device (e.g., user device 104) capable performing spatial interaction with an AR scene, such as process 400, described above. Apparatus 100 may include a camera 1002 as well as a sensor 1004. In one implementation, camera 1002 is a back-facing camera, such that it may capture images of a real-world scene where target 106 is located, while sensor 1004 is front-facing, such that it may track the pose of the apparatus 1000 relative to a user hand 102 on the display-side of the apparatus 1000.

The sensor 1004 may include detectors and/or trackers that may detect and/or track the movement of a user hand 102, finger poses, fist, etc. The sensor 1004 may receive inertial information for the apparatus 1000 from an inertial measurement unit (IMU) to determine whether and how the apparatus 1000 has moved. Additionally, the sensor 1004 may implement mechanisms to determine the position of the apparatus 1000. Such mechanisms may include using data from a network, including triangulation, Wi-Fi positioning, and the like.

Apparatus 1000 also includes a user interface 1008 that includes the display 1026 capable of displaying the AR scene generated by the apparatus 1000. As mentioned above, the AR scene includes images of the real-world scene captured by the camera 1002, as well as the virtual target object 108 and the virtual hand 114. User interface 1008 may also include a keypad 1028 or other input device through which the user can input information into the apparatus 1000. If desired, the keypad 1028 may be obviated by integrating a virtual keypad into the display 1026 with a touch sensor. User interface 1008 may also include a microphone 1030 and speaker 1032.

Apparatus 1000 also includes a control unit 1006 that is connected to and communicates with the camera 1002, sensor 1004, and user interface 1008. The control unit 1006 accepts and processes images received from the camera 1002 and/or from network adapter 1020. The control unit 1006 also accepts and processes data received from sensor 1004 for the tracking of the pose of apparatus 1000 relative to a user hand 102. Control unit 1006 may be provided by a processing unit 1010 and associated memory 1016, hardware 1012, firmware 1014, software 1018, and graphics engine 1024.

Control unit 1006 may further include an augmented reality (AR) engine 1022. AR engine 1022 may be configured to perform one or more spatial interaction procedures, such as described above with reference to process 400 of FIG. 4. Both the images captured by camera 1002 as well as the data provided by sensor 1004 may be provided to the AR engine 1022. The AR engine 1022 may then render or otherwise generate visual elements of the AR scene in an image on the display 1026.

Processing unit 1010 and AR engine 1022 are illustrated separately for clarity, but may be a single unit and/or implemented in the processing unit 1010 based on instructions in the software 1018 which is run in the processing unit 1010. Processing unit 1010, as well as the AR engine 1022 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with apparatus 1000, and is not to be limited to any particular type of memory or number of memories, or type of media upon which memory is stored.

The processes described herein may be implemented by various means depending upon the application. For example, these processes may be implemented in hardware 1012, firmware 1014, a combination of hardware 1012 and software 1018, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or hardware and software combination implementation, the processes may be implemented with modules (e.g., procedures, functions, and so on) that perform the functions described herein. Any computer-readable medium tangibly embodying instructions may be used in implementing the processes described herein. For example, program code may be stored in memory 1016 and executed by the processing unit 1010. Memory may be implemented within or external to the processing unit 1010.

If implemented in firmware and/or a hardware/software combination, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 11:
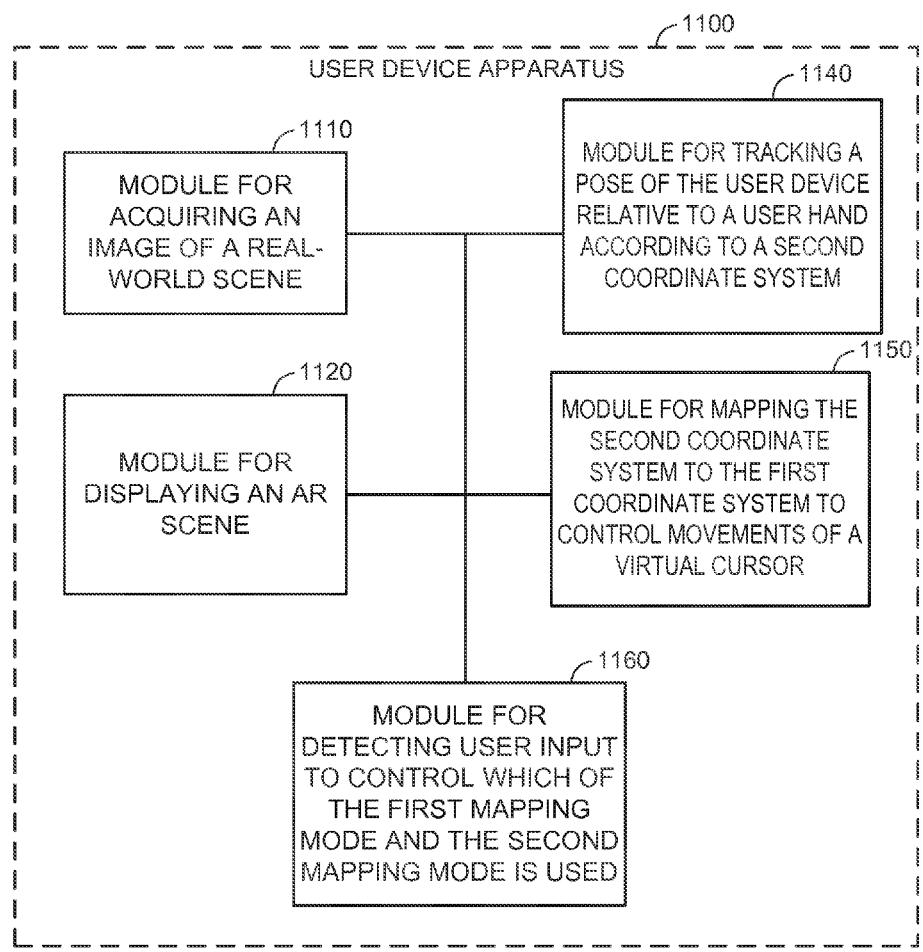
FIG. 11 is a simplified block diagram illustrating several sample aspects of components that may be employed in a user device configured to provide spatial interaction with an augmented reality scene, as taught herein.

FIG. 11 is a simplified block diagram illustrating several sample aspects of components that may be employed in a user device configured to provide spatial interaction with an augmented reality scene, as taught herein. User device 1100 is one possible implementation of user device 104 of FIG. 1, and/or apparatus 1000 of FIG. 10, represented as a series of interrelated functional modules.

A module 1110 for acquiring an image of a real-world scene may correspond at least in some aspects to, for example, a camera 1002 of FIG. 10. A module 1120 for displaying an AR scene may correspond at least in some aspects to, for example, a display 1026 of FIG. 10. A module 1140 for tracking a pose of the user device relative to a user hand according to a second coordinate system may correspond at in some aspects to, for example, AR engine 1022 in combination with sensor 1004, of FIG. 10. A module 1150 for mapping the second coordinate system to the first coordinate system to control movements of the virtual hand may correspond at in some aspects to, for example, AR engine 1022, of FIG. 10. A module 1160 for detecting user input to control which of the first mapping mode and the second mapping mode is used by module 1150 may correspond at in some aspects to, for example, AR engine 1022 in combination with sensor 1004, of FIG. 10.

The functionality of the modules 1110-1160 of FIG. 10 may be implemented in various ways consistent with the teachings herein. In some designs, the functionality of these modules 1110-1160 may be implemented as one or more electrical components. In some designs, the functionality of these modules 1110-1160 may be implemented as a processing system including one or more processor components. In some designs, the functionality of these modules 1110-1160 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects, one or more of such means may be implemented using one or more of processor components, integrated circuits, or other suitable structure as taught herein.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

What is claimed is:
1. A method, comprising:
acquiring, by a user device, an image of a real-world scene;
displaying, by the user device, an augmented reality (AR) scene that includes the image of the real-world scene, a virtual target object, and a virtual cursor, wherein a position of the virtual cursor is provided according to a first coordinate system within the AR scene;
tracking a pose of the user device relative to a user hand according to a second coordinate system that defines a relationship between the user device and the user hand, wherein tracking the pose of the user device relative to the user hand comprises detecting translational movement of the user hand for a first distance;

mapping the second coordinate system to the first coordinate system to control movement of the virtual cursor in the AR scene in response to movements of the user hand, wherein mapping the second coordinate system to the first coordinate system includes a first mapping mode and a second mapping mode, wherein the first mapping mode is configured to control movement of the virtual cursor and includes normalizing the translational movement of the user hand to a translational movement of the virtual cursor a second distance in the AR scene, wherein the second distance is greater than the first distance, and wherein the second mapping mode is configured to control movement of virtual cursor to manipulate the virtual target object within the AR scene, wherein the second mapping mode includes a one-to-one mapping of the second coordinate system to the first coordinate system for a translational movement of the virtual cursor for the first distance in the AR scene; and detecting, at the user device, a user input to control which of the first mapping mode and the second mapping mode is used to control movement of the virtual cursor in the AR scene, wherein detecting the user input comprises detecting at least one of a finger posture or a hand gesture of the user hand.

2. The method of claim 1, wherein detecting the finger posture comprises detecting a finger point of the user hand to manipulate the virtual target object in the second mapping mode.

3. The method of claim 1, wherein detecting the hand gesture of the user hand comprises detecting an open hand gesture of the user hand to change the distance between the virtual cursor and the virtual target object in the AR scene in the first mapping mode.

4. The method of claim 3, further comprising:
detecting a first posture of the user hand; and
switching from the first mapping mode to the second mapping mode in response to detecting the first posture of the user hand.

5. The method of claim 1, wherein detecting the hand gesture of the user hand comprises detecting a pinching gesture by the user hand to change a distance between the virtual cursor and the virtual target object in the AR scene in the first mapping mode.

6. The method of claim 1, wherein mapping the second coordinate system to the first coordinate system according to the first mapping mode comprises:
determining translational and rotational movement of the user hand relative to the user device;
determining translational and rotational movement of the user device relative to the virtual target object; and
combining the translational and rotational movement of the user hand with the translational and rotational movements of the user device to provide translational and rotational movement of the virtual cursor within the AR scene.

7. The method of claim 6, wherein mapping the second coordinate system to the first coordinate system according to the second mapping mode comprises:
determining translational and rotational movement of the user hand relative to the user device; and
mapping the translational and rotational movement of the user hand to a translational and rotational movement of the virtual cursor within the AR scene independent of any translational and rotational movement of the user device relative to the virtual target object.

8. The method of claim 1, wherein virtual cursor is a virtual hand displayed in the AR scene.

9. An apparatus, comprising:
means for acquiring, by a user device, an image of a real-world scene;
means for displaying, on the user device, an augmented reality (AR) scene that includes the image of the real-world scene, a virtual target object, and a virtual cursor, wherein a position of the virtual cursor is provided according to a first coordinate system within the AR scene;
means for tracking a pose of the user device relative to a user hand according to a second coordinate system that defines a relationship between the user device and the user hand, wherein the means for tracking the pose of the user device relative to the user hand comprises means for detecting a translational movement of the user hand for a first distance;
means for mapping the second coordinate system to the first coordinate system to control movement of the virtual cursor in the AR scene in response to movements of the user hand, wherein the means for mapping the second coordinate system to the first coordinate system includes a first mapping mode and a second mapping mode, wherein the first mapping mode is configured to control movement of the virtual cursor and includes normalizing the translational movement of the user hand to a translational movement of the virtual cursor a second distance in the AR scene, wherein the second distance is greater than the first distance, and wherein the second mapping mode is configured to control movement of virtual cursor to manipulate the virtual target object within the AR scene, wherein the second mapping mode includes a one-to-one mapping of the second coordinate system to the first coordinate system for a translational movement of the virtual cursor for a first distance in the AR scene; and
means for detecting, at the user device, a user input to control which of the first mapping mode and the second mapping mode is used to control movement of the virtual cursor in the AR scene, wherein the means for detecting the user input comprises means for detecting at least one of a finger posture or a hand gesture of the user hand.

10. A user device, comprising:
a camera configured to capture an image of a real-world scene;
a display configured to display an augmented reality (AR) scene that includes the image of the real-world scene, a virtual target object, and a virtual cursor, wherein a position of the virtual cursor is provided according to a first coordinate system within the AR scene;
memory adapted to store program code; and
a processing unit coupled to the memory to access and execute instructions included in the program code to direct the user device to:
track a pose of the user device relative to a user hand according to a second coordinate system that defines a relationship between the user device and the user hand, wherein the instructions to track the pose of the user device relative to the user hand comprises instructions to detect a translational movement of the user hand for a first distance;

map the second coordinate system to the first coordinate system to control movement of the virtual cursor in the AR scene in response to movements of the user hand, wherein mapping the second coordinate system to the first coordinate system includes a first mapping mode and a second mapping mode, wherein the first mapping mode is configured to control movement of the virtual cursor and includes normalizing the translational movement of the user hand to a translational movement of the virtual cursor a second distance in the AR scene, wherein the second distance is greater than the first distance, and wherein the second mapping mode is configured to control movement of virtual cursor to manipulate the virtual target object within the AR scene, wherein the second mapping mode includes a one-to-one mapping of the second coordinate system to the first coordinate system for a translational movement of the virtual cursor for the first distance in the AR scene; and detect a user input to control which of the first mapping mode and the second mapping mode is used to control movement of the virtual cursor in the AR scene, wherein the instructions to detect the user input comprises instructions to detect at least one of a finger posture or a hand gesture of the user hand.

11. The user device of claim 10, wherein the instructions to detect the finger posture comprises instructions to detect a finger point of the user hand to manipulate the virtual target object in the second mapping mode.

12. The user device of claim 10, wherein the instructions to detect the hand gesture of the user hand comprises instructions to detect an open hand gesture of the user hand to change a distance between the virtual cursor and the virtual target object in the AR scene in the first mapping mode.

13. The user device of claim 10, further comprising instructions to direct the user device to:
detect a first posture of the user hand; and
switch from the first mapping mode to the second mapping mode in response to detecting the first posture of the user hand.

14. The user device of claim 10, wherein the instructions to detect the hand gesture of the user hand comprises instructions to detect a pinching gesture by the user hand to change the distance between the virtual cursor and the virtual target object in the AR scene in the first mapping mode.

15. A non-transitory computer-readable medium including program code stored thereon, the program code comprising instructions which when executed cause a user device to:
acquire an image of a real-world scene;
display an augmented reality (AR) scene that includes the image of the real-world scene, a virtual target object, and a virtual cursor, wherein a position of the virtual cursor is provided according to a first coordinate system within the AR scene;
track a pose of the user device relative to a user hand according to a second coordinate system that defines a relationship between the user device and the user hand, wherein the instructions to track the pose of the user device relative to the user hand comprises instructions to detect a translational movement of the user hand for a first distance;
map the second coordinate system to the first coordinate system to control movement of the virtual cursor in the AR scene in response to movements of the user hand, wherein mapping the second coordinate system to the first coordinate system includes a first mapping mode and a second mapping mode, wherein the first mapping mode is configured to control movement of the virtual cursor and includes normalizing the translational movement of the user hand to a translational movement of the virtual cursor a second distance in the AR scene, wherein the second distance is greater than the first distance, and wherein the second mapping mode is configured to control movement of virtual cursor to manipulate the virtual target object within the AR scene, wherein the second mapping mode includes a one-to-one mapping of the second coordinate system to the first coordinate system for a translational movement of the virtual cursor for the first distance in the AR scene; and
detect a user input to control which of the first mapping mode and the second mapping mode is used to control movement of the virtual cursor in the AR scene, wherein the instructions to detect the user input comprises instructions to detect at least one of a finger posture or a hand gesture of the user hand.

16. The non-transitory computer-readable medium of claim 15, further comprising instructions to direct the user device to:
detect a first posture of the user hand; and
switch from the first mapping mode to the second mapping mode in response to detecting the first posture of the user hand.

* * * * *